March 7, 1933.  A. BRUN  1,900,794
SAFETY DEVICE FOR LOCKS
Filed July 29, 1931  2 Sheets-Sheet 1
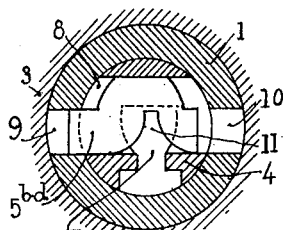
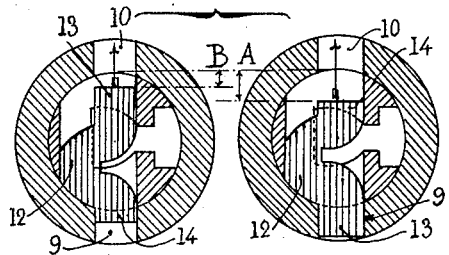
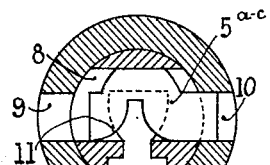
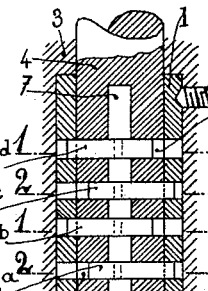
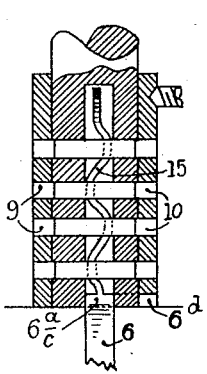
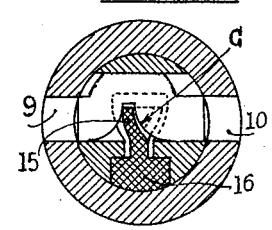
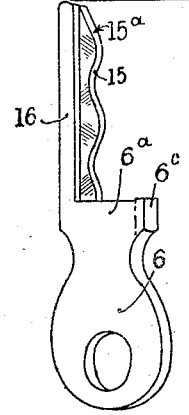
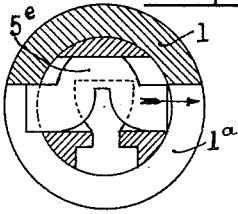
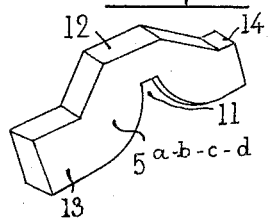
INVENTOR
ALBERT BRUN
By March 7, 1933. A. BRUN 1,900,794
SAFETY DEVICE FOR LOCKS
Filed July 29, 1931 2 Sheets-Sheet 2
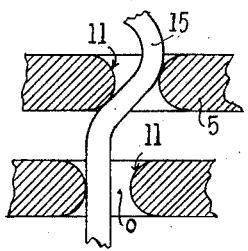
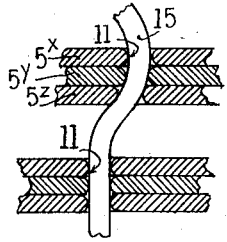
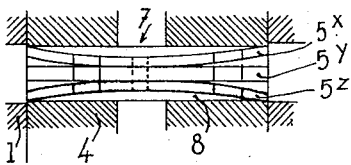
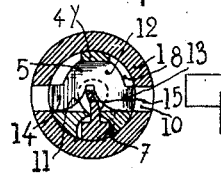
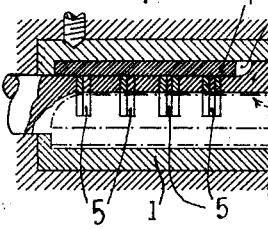
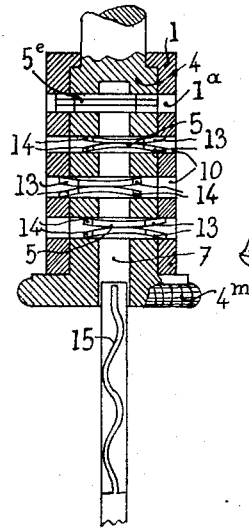
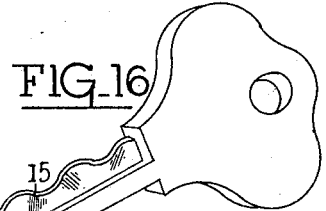
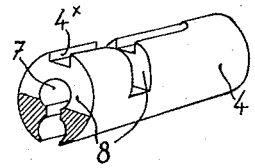
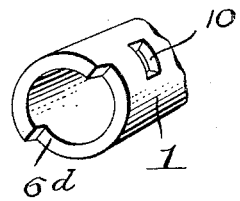
INVENTOR
ALBERT BRUN Patented Mar. 7, 1933

1,900,794

UNITED STATES PATENT OFFICE

ALBERT BRUN, OF PARIS, FRANCE

SAFETY DEVICE FOR LOCKS

Application filed July 29, 1931, Serial No. 553,849, and in France December 6, 1930.

The invention relates to a safety device adaptable to locks, and especially to such devices comprising a cylindrical barrel turning in a stationary body.

The device in question is especially intended to ensure a complete safety against any unauthorized opening of the lock. Moreover the means employed for this purpose enable the overall diameter of the device and consequently of the lock to be considerably reduced.

The device is of the type in which the rotatable barrel forms a guide for a series of bolts or tumblers sliding diametrically thereof and adapted to engage in the stationary body or to be released therefrom by means of a suitable key. In certain of these known devices the tumblers are acted upon by springs.

These locks have the following disadvantages: the springs increase the price, and occupy a considerable space at the cost of the other parts, or otherwise necessitate an increase in the dimensions of the lock, and finally they are liable to break and cause the lock to jam.

In other known devices, the bolts or tumblers are mounted in the rotatable barrel with free play and without springs. But all these tumblers are displaced by their own weight in assuming their locking position and are lifted or released by means of a key with projections which brings them back to the free position.

These devices have the defect that they never guarantee that the tumblers by their own weight assume the locked position, and to minimize this effect, it is necessary to make the tumblers heavy and consequently of a relatively large size, and to mount them with plenty of play in their housing, and these requirements inevitably mean an increase in the overall dimensions of the lock.

Such means, however, also show the following defects:—

As all the bolts or tumblers when in the locked position are engaged in the stationary body on one and the same side, it is easy without using either the key or any tool, to bring them into their unlocked position by turning the lock upside down, and this is quite feasible when the lock is fixed on a box, a piece of furniture or the like which can be inverted.

By inverting the lock the tumblers by reason of their own weight leave the locking position and allow the opening of the lock when they are all in the median position.

The same result might also be obtained by knocking or striking on the part carrying the lock in such a direction that all the tumblers are projected together towards or into the unlocking position.

The improved device here below described eliminates all the defects above mentioned.

It is diagrammatically shown in the appended drawings wherein

Fig. 1 is a section according to the lines 1—1 of Fig. 3.

Fig. 2 is a section according to the lines 2—2 of Fig. 3.

Fig. 3 is a longitudinal section showing the tumblers in their locked position.

Fig. 4 shows the tumblers in their unlocked position.

Fig. 5 is a similar section to that of Fig. 2 but shows the tumbler in its unlocked position.

Fig. 6 shows the key.

Fig. 7 shows one of the tumblers.

Fig. 8 shows a device adapted by means of a bolt or tumbler provided with two long teeth, to limit the rotation of the central rotatable barrel of the lock to 180° for instance.

Fig. 9 is intended to show that although in a general way the tumblers may be similar by reason of their respectively reversed positions, they assure the fastening of the lock in spite of it being turned upside down or struck.

Fig. 10 shows the minimum width that it is necessary to give the notch in the bolts or tumblers in order to obtain sufficient play between the key and the sides of the notch which play must be greater in the case of thicker tumblers.

Fig. 11 shows that by making every tumbler of several similar separate pieces and simply fitting one to the other said play can be practically eliminated.

Fig. 12 shows such a composite tumbler of which at least one of the members is curved so as to create, by fitting against the walls of its guideway, a friction resisting the displacement of the tumbler, whereby the longitudinal movements of the key are restrained, thus preventing it falling out by itself once it is inserted in the device.

Fig. 13 is a vertical longitudinal section of the device but of a different design to that shown in Figs. 1–4.

Fig. 14 shows a transverse section thereof.

Fig. 15 shows the same device, in a horizontal longitudinal section, but with this feature that a knurled ledge or rim is shown on the rotatable barrel.

Fig. 16 shows another form of the key.

Fig. 17 shows separately, a portion of the length of the barrel, in which the tumblers slide transversely.

Fig. 18 is a fragmentary perspective view of the casing illustrating the semi-circular recess therein.

Generally speaking, the device comprises a cylindrical casing 1 mounted and fixed, for instance by means of a screw 2 in a stationary or fixed body 3, a barrel 4, a certain number of tumblers $5^a$, $5^b$, $5^c$, $5^d$ and a key 6.

The barrel 4 is mounted to turn in the cylinder 1 and is provided with a longitudinal groove 7 to receive the key 6 and with transverse grooves 8 in each of which one of the tumblers $5^a$ to $5^d$ is placed, the casing 1 is formed with apertures 9, 10 corresponding to the grooves 8.

Each tumbler such as $5^a$ is formed with a notch 11 having a flared or bell shaped mouth, this notch is however not located at the middle of the length of the tumbler.

Each tumbler is shaped in such a manner as to present a boss or ledge 12 and two teeth, a long one 13 and a short one 14.

A particular feature of the key 6 is that its effective part is composed of a rib 15 of a small but uniform thickness which projects towards the axial centre of the key, starting from a part 16 of greater thickness. By a simple die stamping operation the rib 15 is undulated laterally so as to have a profile corresponding to the combination of tumblers 5 arranged in the barrel 4.

The extremity of the rib 15 has the shape of a straight ramp $15^a$ by means of which the key is enabled to enter into engagement with all the tumblers whatever their diametrical position may be. This action is facilitated by the fact that the notches 11 in the tumblers have a flared shape.

According to one of the features of the invention, the tumblers are distributed into two groups. The tumblers of one group have their long teeth placed on the side opposite to that occupied by the long teeth of the other group.

In the example shown in the Figs. 3 and 4 the successive tumblers are alternatively arranged in such a manner that the long tooth of the first one ($5^a$) is followed by the short tooth of the second one ($5^b$) and so on. But any other combination might be chosen, provided that in no case shall all the long teeth be situated on the same side.

The undulations 15 of the key must correspond to the combination chosen.

The device functions as follows, viz:—

When the device is in its locked position (Figs. 1 to 3) all notches 11 are in the same line (Fig. 3). By introducing the key 6 all the tumblers are brought into the released position, thus allowing the barrel 4 to be turned by means of the key which barrel in its turn operates the bolt proper of the lock.

By withdrawing the key, the tumblers are successively and positively engaged and left engaged with the stationary or fixed casing 1, the long teeth of the tumblers entering into the apertures 9 and 10.

The portion $6^a$ of the key (Fig. 6) engages in a radial slot $6^b$ of the barrel 4 which enables the latter to be easily turned (Fig. 4).

The key may be provided with a projection $6^c$ which overlaps the diameter of the barrel 4 and enters into a semi-circular recess $6^d$ in the fixed casing 1. This arrangement limits rotation of the system 6, 4, $5^a$ by the key to 180°.

The same result could be obtained by using a tumbler $5^e$ (Figs. 8 and 15) having two long teeth of which one at least is always engaged in a semi-circular recess $1^a$ in the fixed casing 1. The use of this tumbler $5^e$ also serves to fix the rotatable barrel 4 longitudinally in regard to the fixed casing 1.

This arrangement would be especially suitable in the case where the mechanism should comprise a fairly large number of tumblers $5^a$, $5^b$, etc., it is only as an example that four tumblers are shown.

With the arrangement just described, owing to the fact that each of the tumblers is provided with a projection 12, a long tooth 13 and a short one 14 and as the tumblers occupy positions which are diametrically opposite, it is not likely that these tumblers can ever, without the aid of a proper key, be brought all together and on the same side into an unlocked position in relation to the apertures 9 or to 10 in the casing 1.

Fig. 9 shows how, when the device is placed in such a manner, that the tumblers displace themselves by falling vertically, the long tooth of certain tumblers (at the right in the figure) will be completely engaged in the corresponding aperture 9 in the casing, the projections 12 resting against the internal wall of this casing, and the short teeth 14 of these tumblers will be removed from locking engagement with the corresponding apertures 10 by an amount designated by A on Fig. 9. Now the other tumblers (on the left of the figure) will have their long teeth removed only by the amount B from the entry of the corresponding aperture 10.

By reason of this characteristic arrangement, any means, such as turning the lock upside down, shocks and the like (other than the use of the suitable key) used in an endeavour to bring all the tumblers into an unlocking position will be inoperative, since such means effect a displacement simultaneously and in the same sense of all the tumblers and because the travel of the latter is different for each tumbler.

In fact, in case of upsetting the lock for instance, the long tooth 13 of the left tumbler (Fig. 9) will penetrate into the aperture 10 before the long tooth of the right hand tumbler has left the aperture 9.

If the tumblers are horizontal and the lock is struck from the side, all the tumblers are simultaneously displaced and the same result as above is obtained.

Apart from this characteristic result, the arrangements described allow devices to be designed, the casing 1 of which may have an overall diameter of only 1 cm., which makes their adaption to small locks possible. The possibility of arriving at a design of so small a diameter is mainly due to the combination of the tumblers as above described with a key with a laterally undulated rib 15. In effect the undulations go from side to side of the center C of the system (Fig. 5) in the diametrical direction of the tumblers and the body 16 of the key is engaged in the barrel 4 outside of the space occupied by the tumblers. The fact that on the one hand the rib 15 is engaged in the notches 11, and that on the other hand these latter occupy the centre or the proximity of the centre C, and finally that the action of said rib 15 is effected laterally from the centre of the tumblers permits the arrangement of the parts about the axial centre line C and consequently enables a device of very small dimensions to be obtained.

In other words the possibility of making the unit of a small diameter without unduly weakening the parts, is due to the fact that the tumblers generally occupy only one half part of the device, which allows a sufficient space to be allotted to the key in the other half of the device. As the undulated rib of the key engages in the notches in the tumblers and as these notches are located in the first half, it follows that by reason of this assembly of the parts, that the key can be relatively very, very strong, without the tumblers and their rotatable barrel being thereby unduly weakened.

In the example shown in Figs. 10–17 it is seen, especially in the example according to Fig. 17, that it is quite easy to mill the transverse recess 8 in the barrel 4. When assembling the device a small feather or slide $4^y$ is placed into the longitudinal slot $4^x$, which slide thereafter is retained in place by the casing 1, and serves as a guide to the apex of the projections 12 on the tumblers.

The slot 7, for the passage of the key, is obtained by drilling two parallel holes and then connecting them by longitudinal milling.

Each tumbler designated in a general manner by 5, is constituted by at least two identical parts which are assembled and then introduced in the corresponding recess 8. At least one of these parts ($5^x$, $5^y$, $5^z$, Figs. 11 and 12) is curved lengthwise in such a manner that the assembled tumbler fits against the walls of the recess 8. Each element $5^x$, $5^y$, $5^z$ being thin and resilient to a certain extent fits and presses against the adjacent element about the centre of the tumbler (Fig. 12). At its summit, the flared notch is substantially as wide as the constant thickness of the undulated rib 15 of the key (Fig. 11).

This small width in the notch would not be possible if the tumbler were made of one piece as thick as the composite tumbler as may be seen by comparing Figs. 10 and 11. The detrimental play is shown at O on Fig. 10.

The knurling of the rim $4^m$ of the barrel shown in Fig. 15 makes it possible to turn the barrel 4 when the key is introduced into the groove 7. This arrangement can be used in the case of very small locks wherein the key, also very small, would not allow a sufficient grip for the hand to manipulate the lock.

What I claim is:

1. A lock comprising a fixed casing having tumbler receiving recesses in opposite side portions thereof, a barrel rotatable within said casing and provided with transverse tumbler accommodating recesses, tumblers within the recesses of said barrel for free sliding movement therein whereby either end of any tumbler may enter a related recess in the casing when the tumblers are alined with said casing recesses, the tumblers being notched to accommodate a laterally undulated key for retracting the tumblers from the casing recesses, the said tumbler notches having flaring mouth portions whereby a laterally undulated key is effective to retract any tumbler irrespective of the position thereof transversely of the barrel.

2. A lock comprising a fixed casing having tumbler receiving recesses, a barrel rotatable within said casing and provided with transverse tumbler accommodating recesses, tumblers within the recesses of the barrel freely slidable into the recesses in the casing, the barrel having a longitudinally extending channel to accommodate a tumbler actuating key and said casing also having a semicircular recess into which a portion of one of the tumblers always extends whereby rotation of the barrel is limited to 180°.

In testimony whereof I hereunto affix my signature.

ALBERT BRUN.